Dec. 31, 1957    G. G. FOTH    2,818,086
SEWER PIPE PLUG AND INDICATOR
Filed March 11, 1955
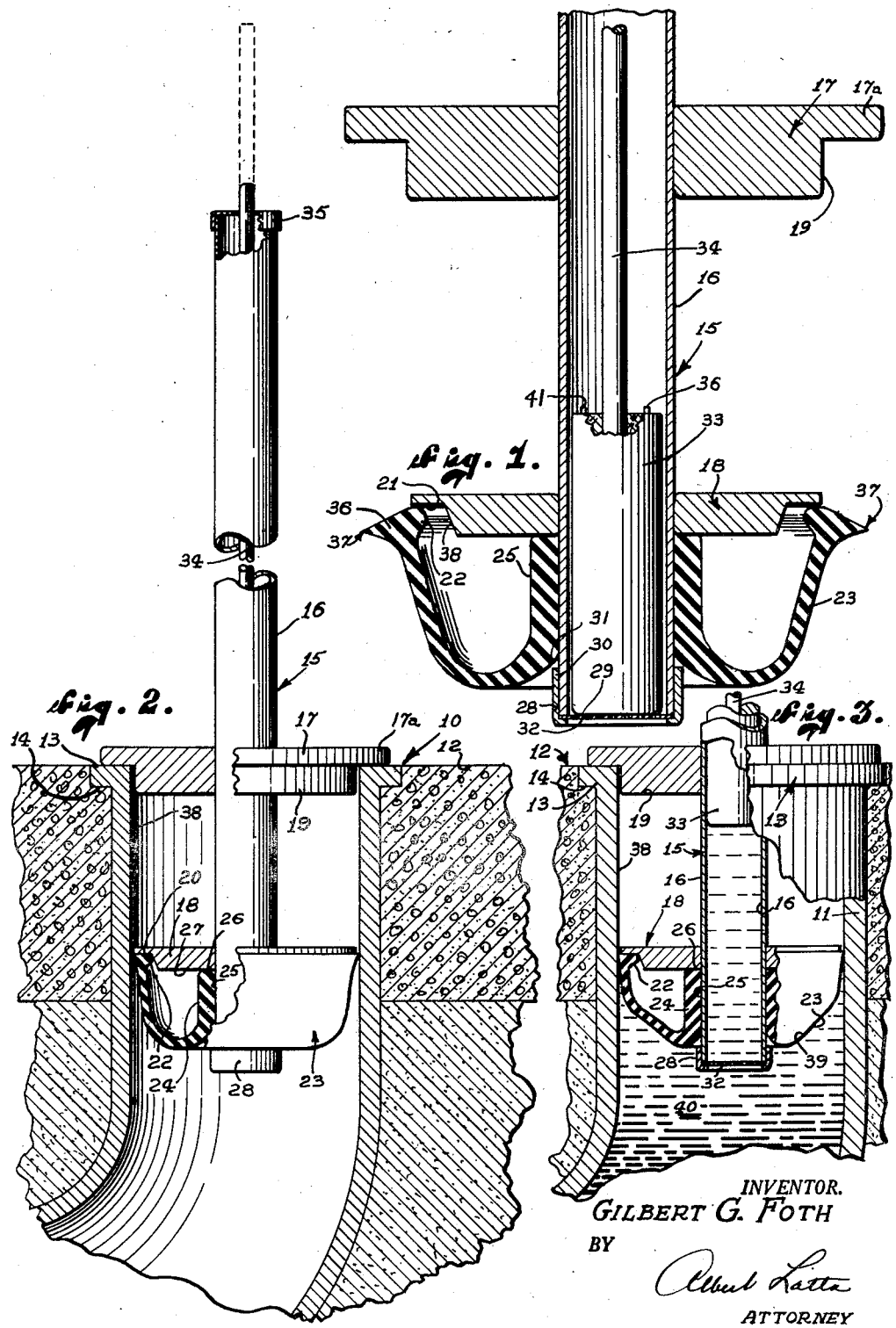
INVENTOR.
GILBERT G. FOTH
BY
ATTORNEY United States Patent Office 2,818,086
Patented Dec. 31, 1957

2,818,086

SEWER PIPE PLUG AND INDICATOR

Gilbert G. Foth, Kenosha, Wis.

Application March 11, 1955, Serial No. 493,652

3 Claims. (Cl. 138—89)

This invention relates to a plug and flood indicator member so be used with a floor drain, and more particularly to a back pressure plug and indicator member which is adaptable for ready insertion in an inlet drain pipe ordinarily connected to a main pipe in a sewer system.

Plug devices, of many kinds, have been used with floor drains over the years. Some of these plugs completely seal off any back flow of sewer water from returning through the floor drain but cause excessive back pressure to build up in the sewer line with resulting damage to the pipe. My invention provides a plug having a hollow cylinder projecting therethrough provided with a movable piston and indicating rod, with said rod and piston rising in the tube to indicate, to an observer, the use of back flow during flooding conditions.

It is understood the plug is effective in preventing back flow through the drain inlet and onto the floor surface under moderate flood conditions. In this particular instance such flooding is minor but does present an unsightly and unhealthy situation. The amount of back pressure is minor and does not approach any critical point such as to create any danger. The use of my plug and indicator does provide a medium for an observer to note that a flood condition does exist in the sewer pipe. If, of course, the flood condition is serious, the rod and piston could conceivably rise to the top of the open tube connected with the plug. In this instance, the open tube could act as a relief for the pressure building up in the sewer pipe and excess flow could be discharged from the free end of the tube.

The primary object of my invention is to provide a device including two disc shaped members spaced on said rod. One of said members is of sufficient area to completely cover the drain hole in the floor after the drain cover has been removed. The other member is of lesser diameter than the first member and is provided with a circular groove to receive the annular free end of a rubber or similar resilient cup-shaped member which is telescopically mounted on the tube adjacent one end thereof. Under back pressure conditions the outer surface of the cup is radially expanded and forced against the inside surface of the drain pipe effecting a seal so as to close off the otherwise open end of the drain pipe. The tube extends above the surface of the floor with the free end of the indicator rod extending from the tube. The other end of the rod is secured to a piston which may be constructed of cork, or like substance, which floats so as to rise along with the water that rises in the tube.

My invention will be better understood from the description thereof to follow taken in connection with the accompanying drawing in which:

Figure 1 is a vertical sectional view of my improved plug assembly prior to insertion within the drain pipe.

Figure 2 is a fragmentary sectional view of a floor drain having my improved drain plug inserted thereinto.

Figure 3 is a fragmentary sectional view similar to Figure 2 but illustrating the affect on the seal and the indicator when a flood condition takes place.

Referring to the drawing, which illustrates the preferred embodiment of the invention, the numeral 10 designates a partial section of one type of conventional floor drain having a drain inlet pipe 11. The pipe is anchored in the floor 12 and provided with an annular flange 13 bearing on an annular shoulder 14 formed in said floor. The inlet drain pipe communicates with one of the pipes (not shown) of a conventional sewage disposal line.

The plug body member 15 comprises a hollow metal tube 16 having a pair of annular elements 17 and 18 spaced from each other and secured to the outside surface of tube 16. Element 17 includes an annular flange portion 17a of larger diameter than the diameter of drain pipe 11, and has depending therefrom and integral therewith, a neck portion 19 of lesser diameter than the inside diameter of drain pipe 11 and adapted to fit within said drain pipe. The annular flange portion 17a may be securely anchored to the flange 13 of the drain inlet pipe as by means of bolts (not shown), or otherwise, or it may be permitted merely to rest over said drain inlet pipe.

The element 18 is provided with an enlarged flange 20 having a diameter less than the inside diameter of drain pipe 11 and is undercut to provide an annular shoulder 21 formed entirely around its bottom edge to provide bearing surface for the annular free end 22 of a resilient cup-shaped sealing member 23. This sealing member has a hub 24 which includes a substantial hollow tube like section 25 which readily expands when such tube is forced over the metal tube 15. It is contemplated that suitable adhesive be used between the section 25 and metal tube 15 whereby to insure close adhesion between said tubes. When the sealing member is assembled onto the tube 15, the top edge 26 of the hub bears against the bottom surface 27 of the disc 18. A cap 28 is then forced over the end 29 of tube 15 with the edge 30 of cap 28 pushed against the free end 31 of the hub. This cap together with the strong adhesion between tube 15 and hub 24 will prevent any displacement of the sealing member 23 from the tube 15. The end wall of the cap is open, and disposed between said opening and the free end of tube 15, is a screen 32 for preventing foreign material, other than sewer water, from entering into the tube 15.

A freely movable piston or float member 33, constructed of cork, or any other suitable light weight material, is disposed within the pipe 15. Secured to said piston is a long wooden rod 34 which extends upwardly in the tube 15 and passes through an open-ended cap 35 on the top of tube 15.

Referring to Figure 1 attention is directed to the sealing member 23 and the piston member 33. This is the arrangement of such members preparatory to insertion into the drain pipe. The annular lip 36 of the sealing member is normally distended to a diameter which is greater than the inside diameter of the drain pipe and the piston rests on the screen 32. In operative position the annular lip 36 is contracted radially inwardly as the plug assembly is forced into the drain pipe a sufficient distance until the element 17 covers the open end of the drain pipe. Forcing the sealing member 23 into the drain pipe causes the lip 36 to move inwardly while riding against the shoulder 21 and constricts the outer periphery 37 of the lip 36 into sealing engagement against the cylindrical internal wall 38 of the drain pipe.

When sewer water 40 backs up in the sewer line so as to enter the drain pipe, back pressure of such flow into the drain pipe pushes against the underside 39 of the sealing member, as shown in Figure 3, increasing the outward radial pressure on lip 36 somewhat to effect a better seal and the back flow also forces the piston 33 upwardly. As the back flow increases, the piston rises higher, and, accordingly, pushes the indicator rod 34 further out of the tube. Stops 41 are disposed on the piston and may butt against cap 35 when the sewer water rises in the tube and wall. By merely observing the rise or fall of the indicator rod, an observer can readily ascertain the level of such back flow of the sewer water above floor level and determine the seriousness of the back flow.

The removal of the body member from the drain pipe is not difficult. This is readily accomplished by grasping the pipe 15 and pulling directly upwardly from the drain after loosening cover 17.

It will be obvious that the plug and indicator is applicable to any conventional construction of floor drain; and that its application to the form illustrated herein is illustrative and not limiting.

I claim:

1. A sewer pipe plug for mounting in an open drain pipe comprising a tube having a pair of spaced disks of different diameters mounted thereon, one disk capable of insertion within said pipe and the other disk capable of closing the pipe opening, a cup shaped resilient member telescopically mounted on said tube and having the edge of said cup bearing on said first disk and arranged to acts as a seal in said pipe.

2. A sewer pipe plug for mounting in an open drain pipe comprising a hollow tube having a pair of spaced disks of different diameters mounted thereon, one disk capable of insertion within said pipe and the other disk arranged to cover the pipe opening, a cup-shaped resilient member having an apertured centrally disposed hub for telescopic mounting on said tube, the outer edge of said first named disk comprising a flange, the edge of said resilient member in close proximity to the underside of said flange and arranged to act as a seal in said pipe.

3. A sewer pipe plug for mounting in a drain pipe comprising a tube having a pair of spaced disks of different thickness and diameters fixed thereon, the smaller disk of lesser diameter arranged within said pipe and the other arranged to cover the pipe opening, said smaller disk having an outer flange portion integral therewith, a cup-shaped resilient member having an upstanding hub telescopically mounted on said tube below said smaller disk with the circular outer edge of said member in close proximity to the underside of said flange, said outer edge arranged to act as a seal in said pipe.

References Cited in the file of this patent

UNITED STATES PATENTS

| | | |
|---|---|---|
| 613,246 | Cole | Nov. 1, 1898 |
| 2,524,501 | Wilhelm | Oct. 3, 1950 |
| 2,562,604 | Conchey | July 31, 1951 |